March 22, 1966  J. W. GREIG ETAL  3,242,245
PROCESS AND APPARATUS FOR FORMING HOLLOW PLASTIC STRUCTURE
Filed June 18, 1965  3 Sheets-Sheet 1
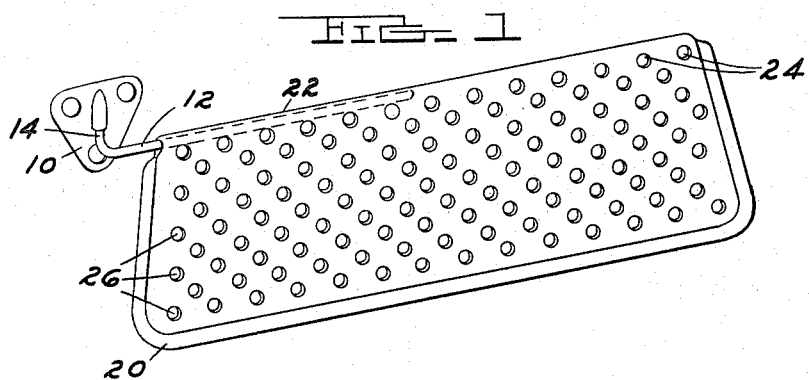
INVENTORS
JAMES W. GREIG
MARVIN H. CUNNINGHAM
BY *Burton & Parker*
ATTORNEYS

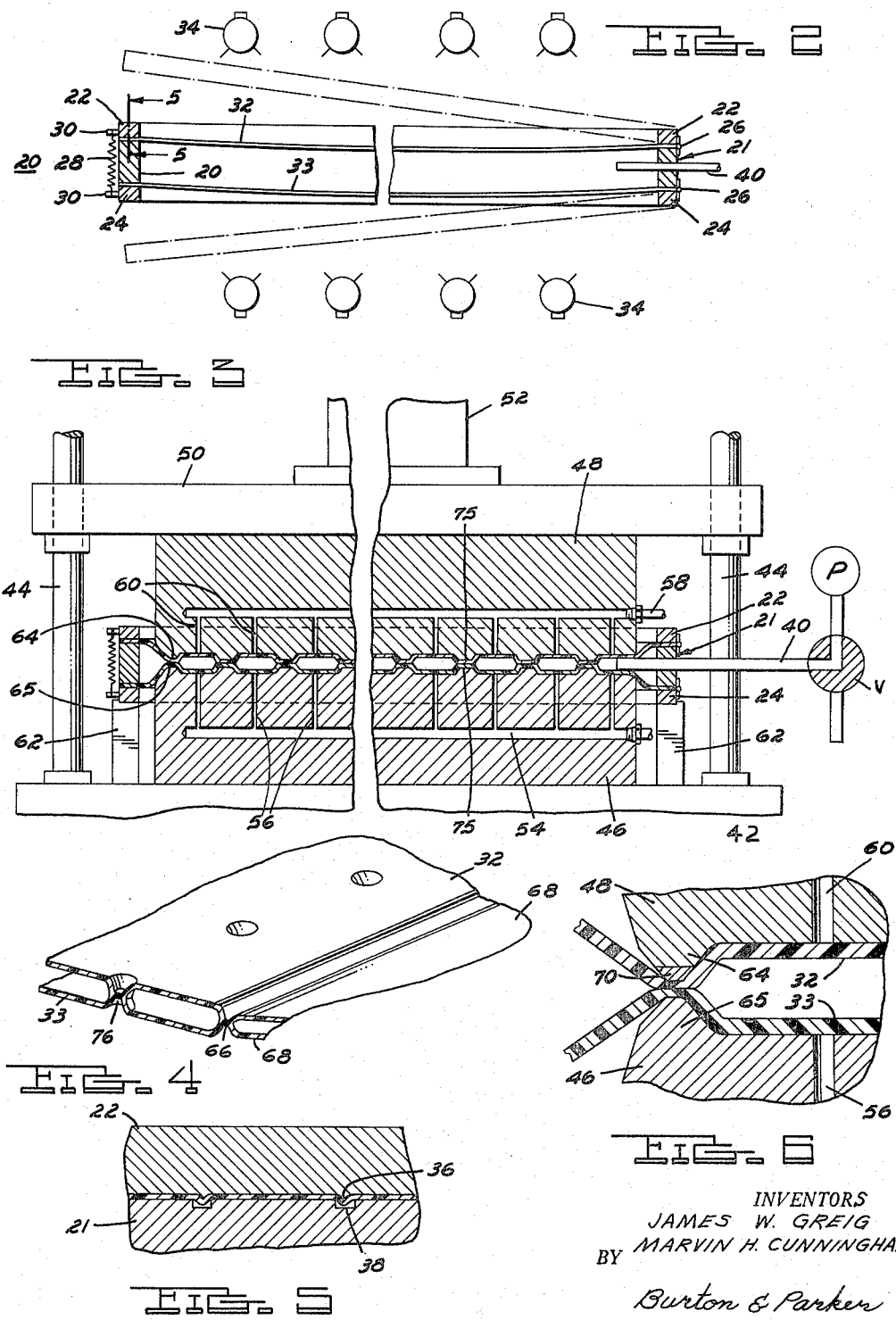

March 22, 1966 J. W. GREIG ETAL 3,242,245
PROCESS AND APPARATUS FOR FORMING HOLLOW PLASTIC STRUCTURE
Filed June 18, 1965 3 Sheets-Sheet 3
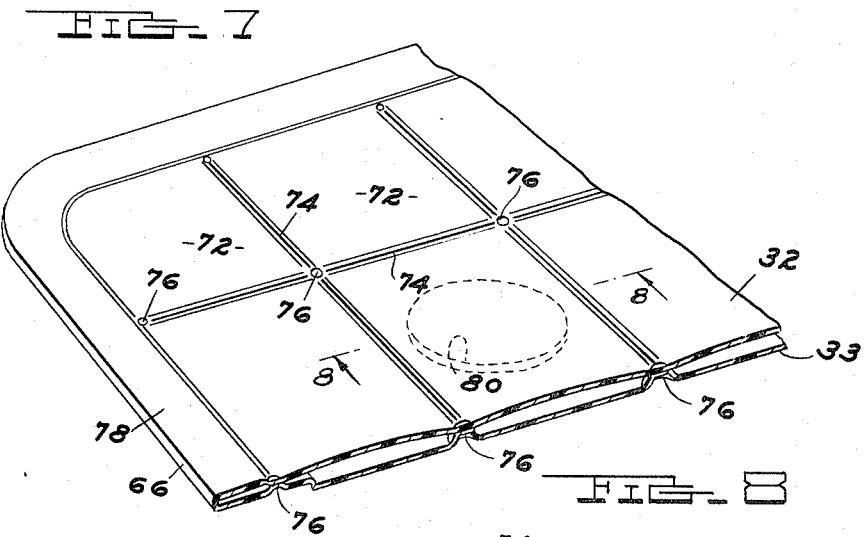
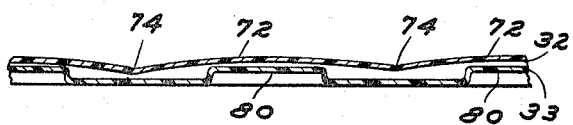
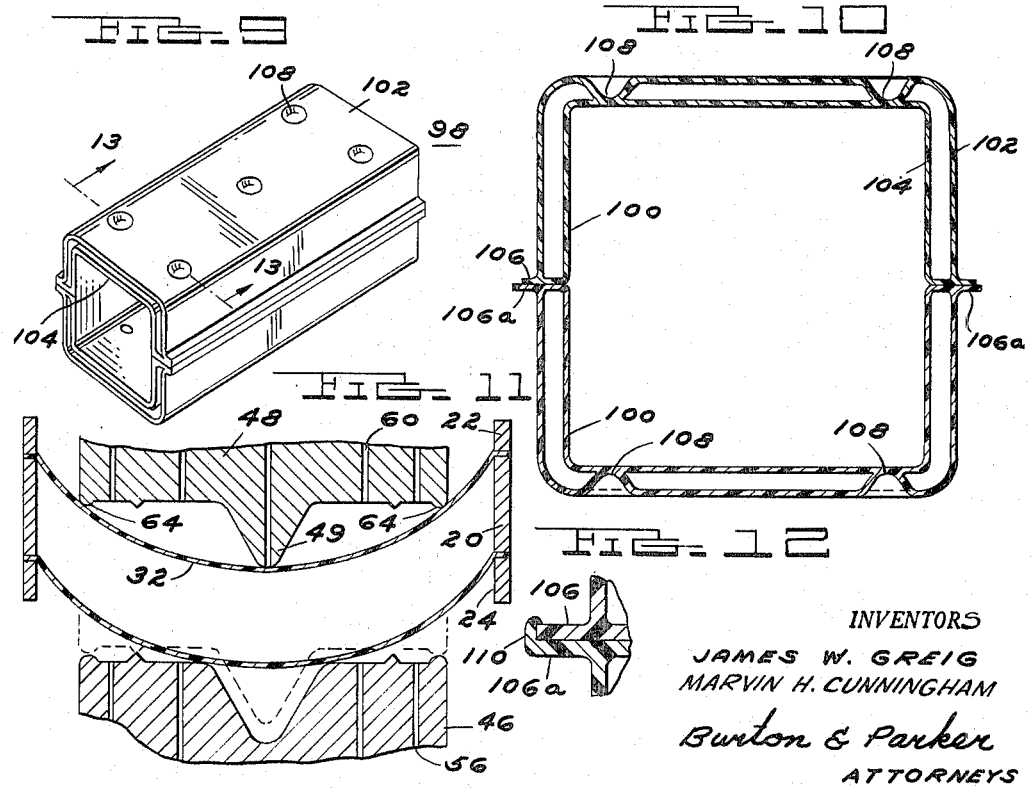
INVENTORS
JAMES W. GREIG
MARVIN H. CUNNINGHAM
Burton & Parker
ATTORNEYS

United States Patent Office 3,242,245
Patented Mar. 22, 1966

3,242,245
PROCESS AND APPARATUS FOR FORMING HOLLOW PLASTIC STRUCTURE
James W. Greig, Grosse Pointe Park, Mich., and Marvin H. Cunningham, Lebanon, Ohio, assignors to Woodall Industries, Incorporated, Detroit, Mich., a corporation of Michigan
Filed June 18, 1965, Ser. No. 467,819
8 Claims. (Cl. 264—89)

This application is a continuation-in-part of our application Serial No. 69,521 filed November 15, 1960.

This invention relates to an improved process of forming a hollow plastic structure.

The improved process of this application is illustrated as particularly adapted for the formation of hollow plastic structures, commonly of a sheet-like character, and which may be embodied in various articles. For example, the process might be employed in the fabrication of a hollow plastic sheet-like sun visor of a character similar to the sun visors which are used in automobile bodies and particularly to a sun visor such as shown in FIG. 1 herein.

Another embodiment might be a hollow sheet-like trim panel of a character similar to the trim panels which are employed on the interior side walls of automobile bodies or overlying the doors thereof or as shown in FIG. 7 herein. Another embodiment might be a hollow plastic sheet such as might constitute a portion of a hot air conducting conduit, chamber, or the like. The invention may be suitable for use in many places where the structure fabricated embodies a hollow structural wall or sheet of the character herein disclosed.

This invention is peculiarly applicable to the formation of structures of the character described and other similar structures wherein cheapness as to cost, light weight, self-supporting rigidity, and strength sufficient to fulfill the purpose of the structure, ease of fabrication, attractive appearance and high strength to weight ratio are combined.

An object is the provision of a process whereby two light-weight, relatively thin, heat-fusible plastic sheets are heated to the fusion point and so supported and so acted upon as to be fused together along a pre-selected boundary line and so held apart within said boundary line as to form a hollow plastic structure. The two sheets which form opposed sides of the hollow structure are also preferably fused together and at a plurality of preselected spaced points within the area enclosed by the boundary line, which points of fusion constitute bridging connections between the sheets. These bridging connections are formed out of the material of the sheets themselves, and such bridging connections hold the sheets in spaced-apart relationship to form the hollow structure.

Heretofore hollow plastic structural shapes have been formed within molds by blow molding a plastic tubular shape or parison within a mold, but such molding is generally employed in forming small hollow shapes such as bottles or the like. The process of this invention is suitable for use in the molding of large size hollow structural shapes. It does not require the pre-formation of a plastic tube or parison with which to start.

In our process two generally complementary plastic sheets are employed to start. These two plastic sheets, heated to a heat-fusible temperature, are held spaced apart preferably by and within a frame to be shaped and fused together while so supported. Preferably they are heated to heat-fusible temperature while supported within the frame. While so heated and supported the sheets are acted upon by die members between which dies the sheets are supported and held within the frame. The dies act co-jointly with cooperating fluid pressure means which deforms the sheets against the die faces to give the sheets the desired shape. The sheets are fused together while they are held within the frame. They are then permitted to take a permanent self-supporting set or cool, all while supported within the frame.

The complementary areas of the sheets between the bridging connection points are so formed and self-supported within the frame as to be held spaced apart. The self-supporting rigidity of the two-ply sheet imparted by the bridging connections and the shaping of the sheets into a hollow structure is such as to provide a hollow structural shape of light weight but which possesses considerable strength and self-supporting rigidity. The hollow character of the structure may be established without the sheets being fused together along their margins; in other words, it might be a hollow wall or panel structure such as a wall structure consisting of two sheets spaced apart and held in spaced relation by bridging connections extending therebetween but open around the margin, being a jacketed type of wall.

A meritorious feature is that simultaneously with the fusing together of selected heated opposed areas of the sheets, other selected heated opposed areas of said sheets are held spaced apart and out of heat-fusible contact with each other to form the hollow structural shape. They may be held deformed out of their normal planar state against die faces to be permanently shaped thereby. As a result, certain areas of said sheets are moved out of their normal planar state and relatively toward each other and fused together simultneously wih the moving of other areas of said sheets apart and out of their normal planar state and against the adjacent faces of the die members to be held spaced apart and against the die faces to be shaped thereby.

A feature of this process is that the fusing of selected opposed areas of the two sheets together and the holding of other selected opposed areas of the two sheets apart is not only carried out substantially simultaneously but the entire opposed areas of said sheets are at the time at substantially the same uniform temperature so that the fusing and shaping of the sheets is accomplished with a minimum of resulting strain and stress.

In one embodiment of the method herein disclosed, after the sheets are vacuum formed and fused together and while they are being held by the die members in such condition, fluid under pressure is introduced between the sheets to urge them even more positively against the faces of the dies during cooling of the sheets, thereby preventing warping or a pulling away of one or both of the sheets from the configuration of the die faces because of contraction of the sheets as they cool.

The two sheets are not only held spaced apart within the frame but are preferably held substantially hermetically sealed within the frame, or at least held so sealed that a differential of pressure is maintained as between the space area between the sheets and that outside of the sheets. A fluid line is provided to conduct fluid such as air into the space within the frame between the sheets in pressure forming or to admit air thereinto in vacuum forming.

The die forming of the sheets, whether by vacuum forming or pressure blow molding, and the fusion and sealing together of the sheets, is not only carried out substantially simultaneously, but as a continuous operation wherein the sheets are drawn against the die members to be shaped thereby, and instantly thereafter fused together at the points of intended fusion between the die members, and thereafter cooled to be self supporting.

Materials which have been found to be suitable for the fabrication of the articles hereinabove described as embodied in the carrying out of the invention are certain polyethylene polymers, which provide the density and flexibility of the sheets as desired. Certain other plastic materials may be employed if desired and as hereinafter set forth.

A meritorious characteristic of structures embodying the invention and fabricated according to the process set forth lies in the fact that these structures do not exhibit localized internal stresses which tend to detrimentally distort the intended shape of the structure. This characteristic of fusion and sealing at localized spaced-apart points without creating residual differential tension areas is particularly important in connection with sheet-like articles of relatively large areas, where different localized tensions would impair the utility of the sheets.

A plurality of different embodiments of the invention are herein illustrated. Certain of these embodiments possess structural features which are particularly important to the particular structure which constitutes the embodiment shown, and which will be described hereinafter in connection with that particular embodiment.

Other objects, advantages, and meritorious features will more fully appear from the following specification, attached claims and appended drawings, wherein:

FIG. 1 illustrates a structure which may be fabricated according to our invention and is embodied in a sun visor for an automobile;

FIG. 2 is a cross-sectional view through a frame used to support the sheets being fabricated to carry out the inventive process herein described;

FIG. 3 is a sectional view through a press within which sheets carried by the frame shown in FIG. 2 may be acted upon in the carrying out of the claimed process;

FIG. 4 is a fragmentary perspective of a structure resulting from the inventive process;

FIG. 5 is a sectional view taken on the line 5—5 of FIG. 2;

FIG. 6 is an enlarged fragmentary section showing a sheet gripped between the hold-down areas of two die members;

FIG. 7 is a fragmentary perspective of a portion of a trim panel embodiment resulting from the inventive process;

FIG. 8 is a cross-sectional view taken on the line 8—8 of FIG. 7;

FIG. 9 is a perspective of a fragment of a portion of a conduit resulting from the inventive process;

FIG. 10 is a cross-sectional view taken on the line 10—10 of FIG. 9;

FIG. 11 is a fragmentary section through a portion of a sheet-supporting frame and cooperating die members disposed to act upon the sheets supported within the frame during the carrying out of the process; and FIG. 12 is a fragmentary section showing the sealing together of complementary trough-like structures to form a conduit as shown in FIG. 9.

The process which forms the invention is illustrated in the drawings as being used in the fabrication of three separate structural embodiments, a visor blade in FIG. 1, a trim panel fragment in FIG. 7 and a conduit in FIGS. 9 and 10.

The above specific forms are merely exemplary.

The process of this application might be used to fabricate many different structures.

There are various plastic compositions which lend themselves to fabrication into structural parts as set forth herein. Polyethylene sheets have been found suitable. Such sheets may be provided in different densities classified as:

Type [1] I—0.910 to 0.925 gram per cc.
Type II—0.926 to 0.940 gram per cc.
Type III—0.941 to 0.965 gram per cc.

[1] ASTM designation D1248–58T.

The polyethylene may be in the form of a homopolymer or in the form of a copolymer.

Other thermoplastic compositions which are suitable are:

Rigid or partly plasticized vinyl homopolymers;
Polystyrene homopolymers or copolymers with acrylonitrile or methylmethacrylate;
Terpolymers of or physical blends of acrylonitrile, butadiene and styrene polymers of the type referred to in the trade as ABS polymers;
Rigid or plasticized cellulose derivatives such as cellulose acetate, cellulose acetate butyrate, cellulose propionate or ethyl cellulose;
Acrylic or modified acrylic compounds.

In carrying out this invention, two plastic sheets of the character hereinabove specified are supported in spaced-apart relationship for heating and shaping and sealing together as desired. It has been found that a preferred manner for supporting the two plastic sheets for heating, die forming, and fusing the same together to form a hollow plastic die-formed structure is to support the sheets within a frame 20 as shown in FIGS. 2 and 3.

In FIG. 2 a simple embodiment of such a frame is illustrated. As there shown, it consists of three frame sections comprising an intermediate section 21, an upper section 22, and a lower section 24. Such frame is here shown as of a shape to support a substantially rectangular trim panel sheet as shown in fragmentary perspective in FIG. 7. The frame might take any desired shape to fit the shape of the article to be produced. The upper and lower sections 22 and 24 of the frame may be independently hinged to the intermediate section 21 by hinges 26 as shown or otherwise be secured thereto. The edge of the frame opposite the hinged edge may have its sections 22 and 24 held tightly to the intermediate section 21 by tensioning springs 28 received over pins 30 as illustrated, thereby clamping the frame sections together so that the space within the frame between the plastic sheets is preferably substantially hermetically sealed.

The plastic sheets are indicated as 32, upper sheet, and 33, lower sheet. These two sheets are shown as gripped within the frame to be supported thereby in spaced substantially parallel relationship. The sheets are shown in solid line in FIG. 2 as slightly sagged, having responded somewhat to the effect of the heating elements 34 disposed above and below the frame. The heating elements may be of any suitable character and are used to heat the sheets to fusion temperatures. These heating elements are here shown as two spaced parallel banks of heat lamps.

The frame sections 21 and 22, as shown in FIG. 5, may be shaped so as to have ribs or detent-like parts 36 received within opposed recesses 38 to grip and hold the sheets securely within the frame against accidental displacement.

The frame structure just described might be of any suitable mechanical arrangement. As shown it is an independent frame assembly which is adapted to support two generally complementary plastic sheets in spaced-apart relationship. Such frame carrying the sheets is adapted to be supported to position the sheets between a pair of die members so that the sheets may be acted upon by the dies. The particular opening of the frame and spacing of the sheets could be as desired. The frame is of such character that the plastic sheets may be heated while held therein to the fusion temperature. While the sheets are supported in the heated state within the frame and the frame is supported to position the sheets between the pair of cooperating die members (see FIG. 3) designed to give the desired shape and form to the hollow plastic structure, the dies are moved to urge selected heated areas of the sheets together therebetween. The frame shown is provided with an air inlet tube 40 communicating with the space between the sheets within the frame and through which air may be admitted. Air valve regulating means 41 is provided in such line to control the flow of air therethrough. A pump P may be provided with valve means V serving to admit or block pressure from the pump to line 40. The valve means V may also be operated to vent line 40 to atmospheric pressure. Our process is suitable for either vacuum molding or blow molding as the case may be.

In FIG. 3 there is schematically shown a die assembly comprising a supporting base 42 provided with upright guide posts 44. There is a lower die member 46 and an upper die member 48. The lower die member is mounted upon the base. The upper die member is supported by an upper die support block 50. This block 50 may be supported by a reciprocating ram 52. The member 50 is slidably supported upon the guide posts 44 to be raised and lowered, as is well understood.

The lower die member is provided with a vacuum line 54 which is shown as having a series of branches 56 leading to separate areas of the die face. The upper die member 48 is provided with a vacuum line 58 provided with a series of branches 60 leading to desired areas of the face of the die member 48. Suitable valve regulating means, not shown, is provided in such lines to control fluid flow therethrough. The cooperating die faces are formed to exhibit the desired contours to shape the adjacent plastic sheets to form the desired structural embodiment.

The base 42 of the die assembly is provided with supports 62 upon which the frame assembly 20 shown in FIG. 2 is adapted to be seated as illustrated in FIG. 3. When so seated, the plastic sheets extend across the space between the two cooperating die faces to be acted upon by such die faces. The frame assembly itself is outside of the space between the die faces as shown. The marginal hold-down portions of the upper and lower die members indicated by the numerals 64 and 65 respectively are adapted to grip the two plastic sheets and hold them securely around the marginal line for sealing around such line. The area of the sheets acted upon is within such marginal line. Such a marginal seal is indicated at 66 in FIG. 4 with marginal selvage portion 68 which may be trimmed off outside the seal line 66.

To facilitate cooperative simple mating engagement of the upper and lower die members along these marginal hold-down edges 64 and 65 and at other desired places, one die member such as 48 may be provided as shown in FIG. 6 at 70 with a nose portion formed of deformable thermosetting polyester or epoxy resin or other suitable material. Such a nose portion 70 may be adhesively secured to the die 48 and can be shaped to fit the opposed area of its cooperating die by being urged against the cooperating hold-down portion 65 of the other die member, thereby eliminating the necessity for accurately cooperatively shaping these die portions 64 and 65 for cooperative mating engagement by laborious hand labor. The die member to which the conformable plastic nose is secured is shaped to roughly agree with the cooperating mating portion of the other die and then the thermosetting resin nose is shaped under die pressure of said other die into mating contact.

The employment of the thermo-setting nose contact portion upon the die member serves another and important purpose. It provides an insulating or non-heat conducting effect in that it retards the absorption of heat from the plastic sheet through the thermo-setting nose contact of the die. It thereby helps to maintain the plastic sheet at such point of proposed fusion at fusion temperature for a longer period of time than would be the case if such contact point were formed of metal. Such contact point if formed of metal capable of absorbing heat rapidly might absorb heat so rapidly as to fail to accomplish complete and satisfactory fusion of the two sheets together within the permitted time period.

FIG. 3 might be considered as illustrating the formation of a generally rectangular trim panel as shown in FIG. 7. Such panel is illustrated in FIG. 7 as formed of two plastic sheets 32 and 33 as hereinabove described. A cross-section is shown in FIG. 8. The upper sheet 32 shown in FIG. 8 may be shaped against the upper die face to exhibit a plurality of squares or blocks 72 which present an embossed cushion-like appearance. These blocks are separated from each other by debossed lines 74. The two sheets are sealed together at spaced-apart points 76 (FIG. 7), which points simulate the securing buttons used in conventional upholstery. The structure is so formed that there is a hollow tubular-like marginal portion 78 which extends about the perimeter of the panel.

The two sheets are sealed together between the hold-down margins 64 and 65 of the dies and along the boundary line 66 as hereinabove set forth. The inner edge of this marginal portion 78 is formed by securing the sheets together at spaced aligned points 76 as hereinabove described.

For a trim panel, the upper plastic sheet 32 may be of a plastic formulation suitable to provide a rather soft cushion-like appearance as indicated hereinabove as Type I or Type II density polyethylene homopolymer or copolymer. The lower plastic sheet 33 may be of a plastic formulation which provides a rather dense, stiff but resilient sheet that forms the foundation or backing of the upper sheet 32, such as Type III 0.941 to 0.946 density polyethylene homopolymer. As shown in FIG. 8, the upper sheet is embossed to define elevated block areas 72 and the lower sheet is debossed to define debossed support areas 80 which may be circular in shape and which underlie but are disconnected from the block areas 72 of the upper sheet as shown particularly in FIG. 8. These debossed areas 80 are relatively stiff but resilient and reinforce and support the block areas 72. The blocks 72 being formed of material which is considerably more flexible than the material of which the lower layer 33 is formed give an initial soft, cushion-like appearance and feeling to the outer surface of the panel. The debossed areas 80 provide a substantially resistant but resilient reaction to further depression of the block 72, so that it permanently maintains its embossed appearance.

Of course it is obvious that the composition of the two sheets may be of whatever plastic formulation is deemed most desirable for the purpose desired. The one described is one that has been found satisfactory for the use in question.

It is believed that certain fundamental features of the process herein described characterize the several structural embodiments of this invention. As hereinabove set forth, two thermoplastic sheets such as polyethylene, of formulations hereinabove set forth, are mounted and supported within a frame in spaced-apart generally parallel relationship. The purpose is to form a hollow structure from these two sheets and to heat-seal the sheets together throughout certain selected areas and hold other selected heated areas of the sheets spaced apart and so shape them as to form the hollow structure into the desired shape; and to so carry out the entire fabrication that the hollow structure will be substantially free from localized tensions which would disadvantageously distort or warp the same. Preferably, therefore, the frame carrying the two sheets is disposed between heating means such as two banks of heat lamps which will heat the sheets to the fusion point and preferably heat them throughout to such fusion point.

Such frame carrying the sheets is then positioned as hereinabove described between the two cooperating die members. As the die members are moved relatively to bring them up against the sheets, a sealing contact is formed between each sheet and its adjacent die member along boundary line 66 (FIG. 3). A vacuum may be drawn between each sheet and the face of the die member and the sheet held against the die face. During this vacuum forming the valve means V may be shifted to a position venting air line 40 to the atmosphere to permit flow of atmospheric air therethrough into the space between the sheets. The movement of the two die members is continued until such are brought together on opposite sides of the two sheets. As appears from FIG. 3, the two sheets are fused together between the dies and around the boundary line established by the die hold-downs 64 and 65. This results in a sealing along the line 66 as shown in FIG. 4. The two sheets would also be fused together at localized spaced points such as 76 between blocks 72. As shown in FIG. 4, at points of sealing such as 76 and along boundary line 66, the two sheets are fused together at points of contact into a homogeneous mass. They are not merely adhered together as independent sheets. They are fused together forming a homogeneous continuity along the line of fusion.

The inlet exhaust tube 40 which is shown as extending through the frame and into the space between the die members is of course encircled by the die members so that the sheets are pressed together entirely around the boundary except where the tube 40 extends thereacross and about such tube the sheets are sealed.

The sheets are also fused together by projecting die portions 75 oppositely formed on the cooperating faces of the die members 46 and 48. The sheets are pinched together between these elevated die points 75 to form the homogeneous dimple-like points of fusion identified as 76 in FIGS. 4 and 7 and as 108 in FIG. 10.

The operation is so carried out that at whatever points fusion is to occur, such takes place simultaneously, and also simultaneously the selected areas of the sheets which are to be held apart are held against the faces of the adjacent die members and so held and formed. The shaping of the sheets and the sealing of the sheets therefore occur at the same time and as a result of the fact that certain selected areas of the sheets are held by a vacuum against the adjacent areas of the die faces and certain other selected areas of the sheets are fused homogeneously together by complementary areas of the die faces, the results achieved are uniform.

Due to the fact that the sheets are preferably heated to a uniform temperature throughout and such sealing and forming occur at the same time under the same temperature conditions and the cooling occurs at the same time throughout the sheet, the entire fabrication can be carried out without producing any localized strains or stresses which might otherwise result in distortion, warping, or the like.

Instead of employing vacuum to draw the sheets against the forming die faces, fluid pressure may be created between the sheets and the sheets urged against the die faces. In such practice the lines 54 and 58 could serve as air exhaust lines through the dies. Both practices are understood.

In the first four figures of the drawing, the invention is shown as embodied in a sun visor. Such a visor includes a visor blade which is formed of two sheets of plastic and may be fabricated in the manner hereinabove described as applying to the trim panel. The normal shape of the visor blade is as shown in FIG. 1. The blade is shown as mounted upon a rod carried by a bracket but the particular construction of the assembly or mounting of the blade upon the rod forms no part of this invention.

In FIGS. 9 and 10 there is shown a structural embodiment of the invention in the form of a conduit or tube indicated generally by the numeral 98. Such conduit might be a hot air conduit for the heating system of a motor vehicle. The conduit 98 is illustrated as made up of two generally complementary hollow halves or channel portions 100. These two channel portions are sealed together as hereinafter described. Each channel portion may be made according to the process hereinabove outlined for the fabrication of the trim panel. It will be seen that each channel portion comprises an outer sheet or wall 102 and an inner sheet or wall 104. These two walls are illustrated as spaced apart so as to provide a hollow or jacket type of channel. Such channels or conduit halves may be formed as hereinabove described. These two conduit halves are thereafter fused together. The expanse areas of these two side walls themselves are held in spaced relationship by the bridging connections or dimples 198. These may be provided in such number as is essential to accomplish the secure spacing of the two walls. It will be seen that the fused margin of the jacketed bottom channel portion, as shown in FIG. 12, which is identified as 106a extends beyond the margin 106 of the upper cooperating channel portion and is fused thereto.

After the two channels are separately formed in the manner described (and it is the independent channels that are formed by the process of this invention), these two channels are secured together. In such securement together the extremity 110 of the marginal portion 106a of the bottom channel (FIG. 12) is folded over the margin 106 and fused thereover so as to form a secure tight joint all along the margin where the two halves of the conduit are secured together.

In FIG. 11 there is shown a situation where the upper die 48 has a deep drawing central area 49. This area 49 would engage the upper plastic sheet 32 as shown and urge the same toward the opposite sheet but before the two sheets were brought into contact to establish fusion at any point, the hold-down portion 64 of the die member 48 would establish sealing contact with the sheet 32 so that a vacuum drawn through the die 48 would pull the sheet 32 up thereagainst.

It has been found that in some instances, to avoid a tendency of the article being formed to shrink, and pull away from the faces of the dies during cooling of the sheets, if a positive fluid pressure is introduced between the sheets, for example, 50 p.s.i. gauge, such pressure will overcome the internal contracting forces of the plastic sheets and will hold them tightly against the die faces during the cooling phase of the process. In addition to preventing shrinkage or deformation of the sheets during cooling, holding the sheets tightly against the die faces results in an improved heat transfer from the sheets to the die faces, and as a result cool-down time is shortened. The introduction of the positive pressure, such as air, is most useful in preventing shrinkage where one or both of the plastic sheets are of such a thickness that the internal contracting forces arising during cooling of the sheets exceeds the effective force of only the vacuum forming atmospheric pressure acting between the sheets. The air valve means V is operated, following the vacuum forming and fusing operations, and with the dies closed and at the commencement of the cooling of the sheets, to establish communication between the line 40 and the air pump P. After the sheets have been cooled sufficiently, and before the dies are opened, the valve means V is operated to discontinue pressurization of line 40 from the pump and vent the line to the atmosphere. The dies are thereupon opened and the formed article removed from therebetween.

As hereinabove set forth, it is apparent that the process described is applicable to the fabrication of various structures embodying the invention. It is likewise apparent that these structures may require establishment of different physical characteristics and therefore the plastic formulations may differ from one another. The plastic sheets will be heat-formable and of a thermoplastic nature but their physical characteristics might differ. It is also apparent that the structural embodiments may possess novel and inventive features that differ somewhat as hereinabove set forth. Such are not claimed in this application.

What is claimed is:

1. That method of forming a hollow plastic structure which comprises: supporting in a horizontal position two heat fusible plastic sheets spaced apart vertically within a frame means at their heat fusible and fluid pressure deformable temperature in spaced apart opposed relationship throughout between a pair of cooperating relatively vertically shiftable die members, with the sheets so supported at such temperature advancing the die members relatively vertically toward each other into contact with the sheets and while still supported spaced apart within the frame means and thereupon establishing a fluid pressure differential across each sheet in which the fluid pressure between the sheets exceeds the fluid pressure between each sheet and the face of its die member causing the sheets to conform to the faces of the die members, while the sheets are at such temperature and such fluid pressure differential continuing to advance the die members relatively to each other to a position bringing determined portions of the two heated sheets into heat fusible contact fusing said portions of the sheets together, and while holding the die members thus against the sheets maintaining determined portions of the opposed sheets in such contact continuing such fluid pressure differential and concurrently cooling the sheets to a temperature sufficiently below the heat fusible temperature forming a permanent fused bond between said determined portions of the sheets and rendering the sheets self-supporting, and following completion of this operation retracting the die members relatively away from each other, and removing the thus formed hollow plastic structure from between the die members.

2. That method of forming a hollow plastic structure as defined in claim 1 characterized in that said two sheets are heated to their heat fusible and fluid pressure deformable temperature while they are supported in spaced apart opposed relationship within the frame means.

3. That method of forming a hollow plastic structure as defined in claim 1 characterized in that the die members are cooled while said determined portions of the sheets are held in heat fusible contact, thereby accomplishing completion of the cooling to self-support of the fused bond of said sheet portions together.

4. That method of forming a hollow plastic structure as defined in claim 1 characterized in that the method set forth in claim 1 is carried forward as a continuous process.

5. That method of forming a hollow plastic structure as defined in claim 1 characterized in that the sheets throughout the areas to be acted upon by the die members are heated to substantially the same temperature throughout.

6. That method of forming a hollow plastic structure as defined in claim 1 characterized in that the sheets are drawn by a vacuum acting through the die members upon the sheets urging them against the faces of the die members.

7. The method as defined in claim 6 characterized in that following the vacuum drawing of the sheets against the faces of the die members and the advancing of the die members relatively to each other to a position bringing determined portions of the two heated sheets into heat-fusible contact, and while the die members are thus held against the sheets, introducing and maintaining a fluid pressure between the sheets of sufficient magnitude to overcome internal contracting forces of a sheet tending to pull it away from the face of its die member during cooling of the sheet, and following cooling of the sheets and prior to retracting the die members relatively away from each other reducing the fluid pressure between the sheets.

8. The method of forming hollow plastic structures, comprising: supporting two heat fusible plastic sheets in spaced relation at their heat fusible temperature between opposed cooperating relatively shiftable die members, advancing the die members relatively toward each other into contact with the sheets, while the sheets are still supported in spaced relation vacuum forming the sheets against the faces of the die members to cause the sheets to conform thereto, continuing advancing the die members relatively toward each other to bring predetermined portions of the two sheets while still at their heat fusible temperature into heat fusible contact and causing fusing of such predetermined portions of the sheets together and forming a passageway between the sheets, injecting through said passageway air under positive pressure between the fused sheets to maintain intimate contact of the sheets with the die faces, and while continuing such positive pressure cooling the sheets.

References Cited by the Examiner
UNITED STATES PATENTS

| | | | |
|---|---|---|---|
| 1,404,320 | 1/1922 | Roberts et al. | 264—96 XR |
| 1,612,651 | 12/1926 | Roberts | 264—96 XR |
| 1,754,502 | 4/1930 | Denmire | 156—285 XR |
| 2,387,747 | 10/1945 | Cowley. | |
| 2,911,677 | 11/1959 | Weber | 264—92 |
| 2,991,500 | 7/1961 | Hagen | 264—96 XR |
| 3,007,206 | 11/1961 | Griswold | 264—90 |
| 3,099,043 | 7/1963 | Held | 264—92 |
| 3,141,196 | 7/1964 | Langecker | 264—96 XR |

FOREIGN PATENTS

| | | |
|---|---|---|
| 219,796 | 1/1959 | Australia. |
| 1,126,402 | 6/1956 | France. |
| 1,166,775 | 6/1958 | France. |

ROBERT F. WHITE, *Primary Examiner.*

M. R. DOWLING, *Assistant Examiner.*